May 1, 1956     F. MÜLLNER     2,743,949
SEAL FOR ROTARY SHAFTS OF GAS-COOLED MACHINES
Filed May 11, 1953
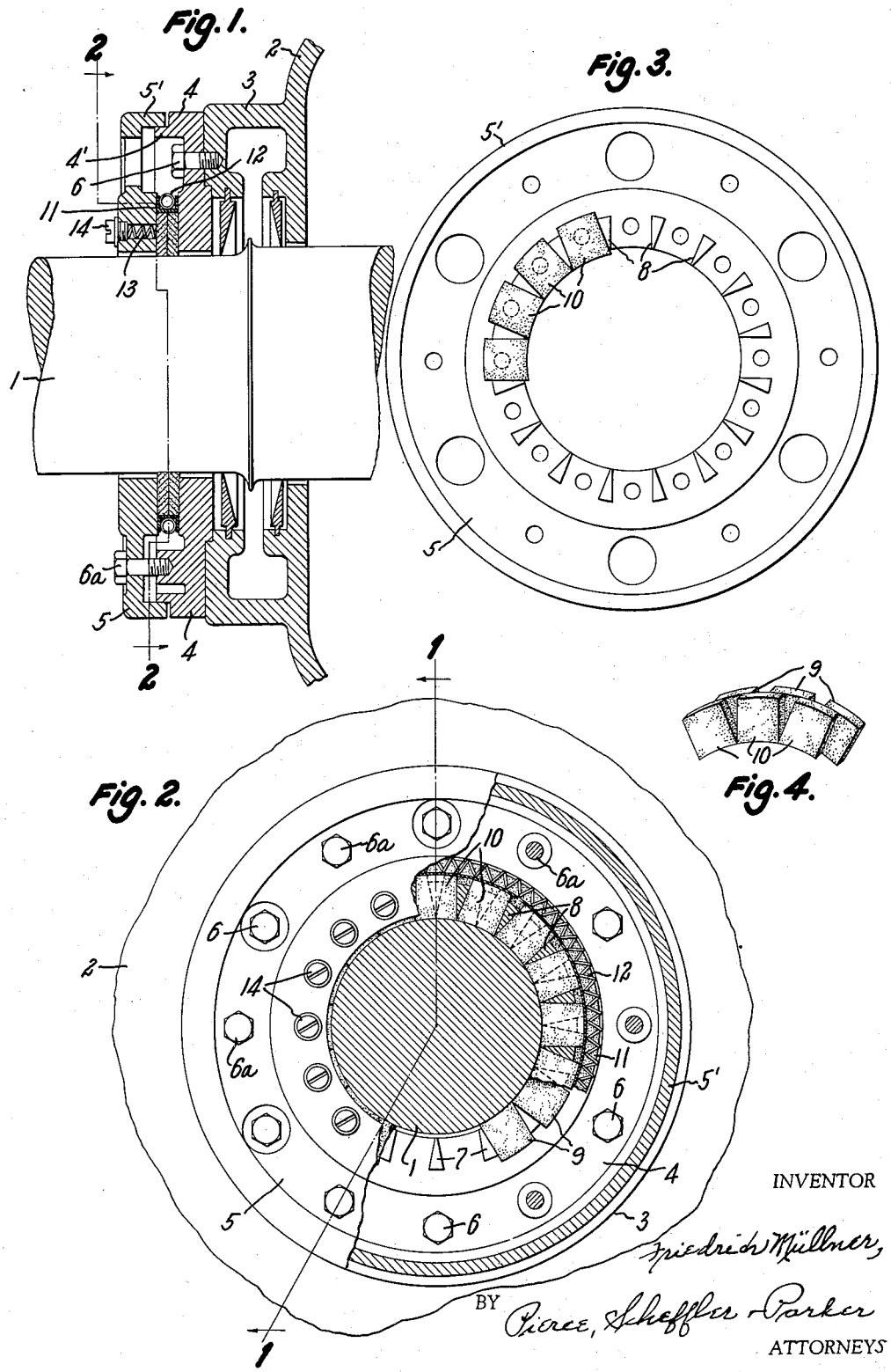
INVENTOR
Friedrich Müllner,
BY Pierce, Scheffler & Parker
ATTORNEYS

United States Patent Office 2,743,949
Patented May 1, 1956

2,743,949

SEAL FOR ROTARY SHAFTS OF GAS-COOLED MACHINES

Friedrich Müllner, Mannheim-Feudenheim, Germany, assignor to Brown, Boveri & Cie., Aktiengesellschaft, Mannheim, Germany, a joint-stock company Application May 11, 1953, Serial No. 353,985

Claims priority, application Germany July 12, 1952

2 Claims. (Cl. 286—22)

This invention relates to seals for rotary shafts of gas-cooled machines, and more particularly to seals for rotary shafts of electrical machines which are cooled by hydrogen or other gases.

A particularly careful sealing of the rotary shaft at the points where it passes through the casing is necessary in gas-cooled electrical machines, and also in other machines such as gas compressors, refrigeration machines and the like. Various proposals have been made for a gas-tight sealing of such shafts and, in general, the prior constructions have relied upon the flow of pressure oil through the narrow gap or clearance between the shaft and a packing, either non-yielding or elastic, to prevent the escape of gas along the shaft. Such packings have the disadvantage that the pressure oil must be continuously supplied to the packing even when the machine is not in operation. A further disadvantage is that the pressure oil comes in contact with the outside air and absorbs air or oxygen which is in part given off when the oil reaches the interior of the machine. This is always objectionable when the gas within the machine casing is not air, and it would result in a dangerous condition within the machine casing when hydrogen or another gas which forms an explosive mixture with oxygen is within the machine casing. To avoid this danger, an extraction of the air or oxygen from the oil is necessary after each passage of the oil through the shaft seal, and the construction becomes rather complex and correspondingly expensive, and requires constant inspection.

Objects of this invention are to provide rotary shaft seals which avoid these objections to or disadvantages of the shaft seals of pressure oil type. Objects are to provide shaft seals which include two sets of sealing elements which each engage the shaft around its entire periphery, the sealing elements of the two sets being in surface contact, preferably on a plane normal to the axis of the shaft, and the joints of the sealing elements of one set being staggered with respect to the joints or meeting surfaces of the adjacent sealing elements of the other set. Objects are to provide shaft seals of the type stated in which the sealing elements of two sets in surface contact engage the shaft around its entire periphery and are of constant or uniform cross-section, as viewed on a plane tangent to the shaft, and are resiliently urged into engagement with the shaft, whereby the sealing elements of each set maintain continuous contact with the entire periphery of the shaft as they wear down and are resiliently adjusted to maintain contact with the shaft. More specifically, an object is to provide a shaft seal of the character stated in which the individual sealing elements of each set are of carbon or graphite, similar to the electrically conductive brushes employed with the collector rings or the commutators of electrical machines, and preferably impregnated with paraffin, grease or the like.

These and other objects and the advantages of the invention will be apparent from the following specification when taken with the accompanying drawing in which:

Fig. 1 is a longitudinal section through a shaft seal embodying the invention, the section being substantially in the plane indicated by section line 1—1 of Fig. 2;

Fig. 2 is a transverse section on the plane indicated by section line 2—2 of Fig. 1;

Fig. 3 is an inner face view of the outer ring member of the shaft seal, and showing some of the sealing elements in position; and Fig. 4 is a fragmentary perspective view of a few sealing elements of the respective sets of sealing elements.

In the drawing, the reference numeral 1 identifies a rotor shaft which passes out of the ends of the closed casing 2 of a machine to be supported by external bearings, not shown. The rotor element is not illustrated as it may be of any desired construction in accordance with the character of the machine, but it is to be understood that the closed casing 2 contains air or gas under some degree of positive pressure, for example hydrogen gas for cooling in the case of a dynamo-electric machine.

The shaft 1 extends through an apertured boss 3 at the end of the machine casing, and two rings or annular members 4 and 5 are rigidly secured to the outer face of the boss 3. As shown, ring 4 is secured to the boss 3 by threaded studs or bolts 6, and the mating surfaces are machined to provide a tight joint which may include packing when the internal pressure is relatively high. Ring 5 is secured to the ring 4 by any convenient means, such as studs 6a, and the rings may be provided with telescoped flanges 4', 5', respectively. The inner diameter of the rings is somewhat greater than the shaft diameter to provide a small clearance between the rings and the shaft.

The outer face of the ring 4 is provided with a series of uniformly spaced wedge-shaped projections 7, and the inner face of the ring 5 is similarly provided with a series of uniformly spaced wedge-shaped projections 8. The opposed sides of adjacent projections of each set are parallel to each other, whereby each set of projections forms a series of radial slots, and the slots of the two rings are staggered. Sealing bodies 9, 10 of rectangular cross-section are seated in the slots of the rings 4, 5, respectively, the sealing bodies being for example paraffined carbon or graphite similar to the carbon brushes employed for electrical contact with commutators and collector rings.

The sealing bodies 9, 10 extend radially outward beyond the ends of the adjacent wedge-shaped projections 7, 8 and the space in which they move is sealed against radially outward leakage of the enclosed gas by a ring 11 of rubber or similar elastic material which surrounds the assembly of sealing members and is seated against the rings 4 and 5. A coil spring 12 surrounds the elastic ring 11 to press the sealing bodies 9, 10 against the shaft 1 and it also improves the sealing action of the ring 11. The inner end surfaces of the sealing members 9, 10 are of course initially arcuate and complementary to the shaft surface which they engage, and they maintain this configuration as they wear down under use.

Since the projections or slots of the two rings 4, 5 are staggered, the sealing bodies of the sets 9 and 10 are similarly staggered and each junction of two adjacent sealing bodies of one set is longitudinally alined with the central portion of a sealing body of the other set. The sets of sealing bodies are pressed lightly against each other by a series of coil springs 13 mounted in longitudinal bores of the ring 5 and retained in place by threaded plugs 14. The spring 12 is of such strength as to overcome the frictional resistance caused by the lateral springs 13 and to retain the sealing members in contact with the shaft 1 under a pressure which does not result in excessive heating from friction between the shaft and the sealing members.

The closed ring of sealing bodies 9, 10 provides an almost perfect sealing of the shaft and casing when the pressure within the casing 2 is comparatively low. The closed ring, because of the completely elastic mobility of the component members 9, 10 follows the changes of the shaft diameter caused by the heat expansion and also the possible slight transverse movements of the shaft. The sealing is equally effective when the machine is in operation and is out of service. Attendance and servicing are required only after extended periods of use, and the sealing members are easily replaced when worn down.

While the illustrated single ring of sealing bodies affords an adequate shaft seal for only a limited pressure difference between the interior of the casing 2 and the atmosphere, a plurality of the sealing rings may be arranged in series along the shaft to step a high internal pressure down by stages. When a plurality of sealing stages are employed with gas-cooled electric machines operating under considerable pressure, the innermost sealing stage may be of a known pressure oil type when the outer stages are constructed in accordance with the invention. With this arrangement the spaces along the shaft, and between the innermost pressure oil packing and the exterior of the machine casing, are filled with the cooling gas at progressively decreasing pressures and the sealing oil is thereby isolated from contact with the outside air. In such cases, the use of shaft packings according to the invention eliminates the need for equipment for removing air from the oil employed in the innermost shaft sealing stage.

It is to be understood that the invention is not limited to the particular construction herein shown and described, as various changes which may occur to those familiar with the art, for example changes in the form of the springs for pressing the sealing members towards each other and to the shaft, fall within the spirit and scope of the invention as set forth in the following claims.

I claim:

1. A shaft seal for use with an enclosed gas-filled machine casing housing a rotor on a shaft which extends to the exterior of the casing, said shaft seal comprising a pair of ring members arranged around and normal to the shaft, means securing one of said ring members to the casing, means securing the other of said ring members to the ring member which is secured to the casing, said ring members being secured against relative angular displacement, the opposed radial faces of said ring members being each provided with a circumferential set of wedge shaped projections forming radially extending slots between the sides of said projections, the opposed sides of adjacent projections of each said ring member being parallel to each other, and the respective sets of projections on said ring members being circumferentially staggered, sets of sealing bodies disposed respectively in the slots of said ring members with the inner ends of said sealing bodies in surface contact with the surface of the shaft and with adjacent faces of said sets of sealing bodies in contact, the sealing bodies of one set being circumferentially staggered with respect to the sealing bodies of the other set in accordance with the circumferential staggering of said sets of projections, spring means individual to and bearing at one end against the sealing bodies of one set and mounted in circumferentially spaced bores in the ring member supporting that set for yieldingly urging said adjacent faces of said bodies into contact with each other, plug means retaining the other ends of said springs in said bores and means surrounding said sets of sealing bodies for urging the inner ends of the same into engagement with the surface of the shaft.

2. A shaft seal as defined in claim 1 wherein said means surrounding said sets of sealing bodies for urging the inner ends of the same into engagement with the shaft comprises an elastic ring having a circumferential groove therein, said ring surrounding and spanning said sets of sealing bodies, and a ring spring seated in said groove.

References Cited in the file of this patent

UNITED STATES PATENTS

| 1,580,603 | Jabs | Apr. 13, 1926 |
| 1,848,328 | Durham | Mar. 8, 1932 |
| 1,891,436 | Michell | Dec. 20, 1932 |
| 1,891,798 | Cheshire | Dec. 20, 1932 |

FOREIGN PATENTS

| 7,265 | Great Britain | Mar. 26, 1909 |
| 803,870 | Germany | Apr. 12, 1951 |
| 857,154 | France | Apr. 8, 1940 |